United States Patent
Wei et al.

(10) Patent No.: US 12,045,310 B2
(45) Date of Patent: Jul. 23, 2024

(54) METHOD AND SYSTEM FOR ACHIEVING OPTIMAL SEPARABLE CONVOLUTIONS

(71) Applicant: Peng Cheng Laboratory, Shenzhen (CN)

(72) Inventors: Tao Wei, Shenzhen (CN); Yonghong Tian, Shenzhen (CN); Yaowei Wang, Shenzhen (CN); Yun Liang, Shenzhen (CN); Chang Wen Chen, Shenzhen (CN); Wen Gao, Shenzhen (CN)

(73) Assignee: Peng Cheng Laboratory, Shenzhen (CN)

( * ) Notice: Subject to any disclaimer, the term of this patent is extended or adjusted under 35 U.S.C. 154(b) by 401 days.

(21) Appl. No.: 17/469,274

(22) Filed: Sep. 8, 2021

(65) Prior Publication Data

US 2023/0075664 A1 Mar. 9, 2023

(51) Int. Cl.
*G06F 18/21* (2023.01)
*G06N 3/02* (2006.01)

(52) U.S. Cl.
CPC .............. *G06F 18/21* (2023.01); *G06N 3/02* (2013.01)

(58) Field of Classification Search
CPC ........ G06F 18/21; G06N 3/02; G06N 3/0464; G06N 3/08; G06V 10/82
See application file for complete search history.

(56) References Cited

U.S. PATENT DOCUMENTS 10,984,245 B1 * 4/2021 Tran ..................... G06F 18/2111

OTHER PUBLICATIONS

Gao et al., "ChannelNets: Compact and Efficient Convolutional Neural Networks via Channel-Wise Convolutions," Feb. 2020, in IEEE Transactions on Pattern Analysis and Machine Intelligence, vol. 43, No. 8, pp. 2570-2581, Aug. 1, 2021 (Year: 2020).*
Lin et al., "LdsConv: Learned Depthwise Separable Convolutions by Group Pruning," Aug. 4, 2020, Sensors (Basel, Switzerland) vol. 20,15 4349, doi:10.3390/s20154349 (Year: 2020).*

(Continued)

*Primary Examiner* — Emily C Terrell
*Assistant Examiner* — Julia Z. Yao
(74) *Attorney, Agent, or Firm* — ANOVA LAW GROUP, PLLC

(57) ABSTRACT

Disclosed is a method and system for achieving optimal separable convolutions, the method is applied to image analyzing and processing and comprises steps of: inputting an image to be analyzed and processed; calculating three sets of parameters of a separable convolution: an internal number of groups, a channel size and a kernel size of each separated convolution, and achieving optimal separable convolution process; and performing deep neural network image process. The method and system in the present disclosure adopts implementation of separable convolution which efficiently reduces a computational complexity of deep neural network process. Comparing to the FFT and low rank approximation approaches, the method and system disclosed in the present disclosure is efficient for both small and large kernel sizes and shall not require a pre-trained model to operate on and can be deployed to applications where resources are highly constrained.

5 Claims, 2 Drawing Sheets

(56) References Cited

OTHER PUBLICATIONS

Gibson et al., "Optimizing Grouped Convolutions on Edge Devices," 2020 IEEE 31st International Conference on Application-specific Systems, Architectures and Processors (ASAP), Manchester, UK, 2020, pp. 189-196, doi: 10.1109/ASAP49362.2020.00039. (Year: 2020).*

Wang et al., "DSXplore: Optimizing Convolutional Neural Networks via Sliding-Channel Convolutions," 2021 IEEE International Parallel and Distributed Processing Symposium (IPDPS), Portland, OR, USA, 2021, pp. 619-628, doi: 10.1109/IPDPS49936.2021. 00070. (Year: 2021).*

Tsai et al., "Performance-Portable Autotuning of OpenCL Kernels for Convolutional Layers of Deep Neural Networks," 2016 2nd Workshop on Machine Learning in HPC Environments (MLHPC), Salt Lake City, UT, USA, 2016, pp. 9-18, doi: 10.1109/MLHPC. 2016.005. (Year: 2016).*

Bi et al. Gold-nas: Gradual, one-level, differentiable. arXiv preprint arXiv:2007.03331, 2020. 2, 3.1.

Chen et al. Progressive differentiable architecture search: Bridging the depth gap between search and evaluation. In Proceedings of the IEEE International Conference on Computer Vision, pp. 1294-1303, 2019. 2, 3.1, B.

Dai et al. Fbnetv3: Joint architecture-recipe search using neural acquisition function. arXiv preprint arXiv:2006.02049, 2020. 1.

Deng et al. Imagenet: A large-scale hierarchical image database. In 2009 IEEE conference on computer vision and pattern recognition, pp. 248-255. Ieee, 2009. 1, 3.2.

He et al. Deep residual learning for image recognition. In Proceedings of the IEEE conference on computer vision and pattern recognition, pp. 770-778, 2016. 1, 1, 1, 2.3, 3.1, E.

Howard et al. Searching for mobilenetv3. In Proceedings of the IEEE International Conference on Computer Vision, pp. 1314-1324, 2019. E.

Howard et al. Mobilenets: Efficient convolutional neural networks for mobile vision applications. arXiv preprint arXiv:1704.04861, 2017. 1, E.

Ioannou et al. Training cnns with low-rank filters for efficient image classification. arXiv preprint arXiv:1511.06744, 2015. 1, E.

Ioffe et al. Batch normalization: Accelerating deep network training by reducing internal covariate shift. arXiv preprint arXiv:1502. 03167, 2015. C.

Jaderberg et al. Speeding up convolutional neural networks with low rank expansions. arXiv preprint arXiv:1405.3866, 2014. 1, E.

Krizhevsky et al. Learning multiple layers of features from tiny images. 2009. 1, 3.1.

Krizhevsky et al. Imagenet classification with deep convolutional neural networks. In Advances in neural information processing systems, pp. 1097-1105, 2012. 1.

Lindeberg, A computational theory of visual receptive fields. Biological cybernetics, 107(6): 589-635, 2013. 1, 2.2.

Liu et al. Darts: Differentiable architecture search. arXiv preprint arXiv:1806.09055, 2018. 1, 2, 3.1, 4, B, E.

Podlozhnyuk, Fft-based 2d convolution. NVIDIA white paper, 32, 2007. 1, E.

Quarteroni et al. Numerical mathematics, vol. 37. Springer Science & Business Media, 2010. 1, E.

Real et al. Regularized evolution for image classifier architecture search. In Proceedings of the aaai conference on artificial intelligence, vol. 33, pp. 4780-4789, 2019. 1.

Sandler et al. Mobilenetv2: Inverted residuals and linear bottlenecks. In Proceedings of the IEEE conference on computer vision and pattern recognition, pp. 4510-4520, 2018. 2.3, E.

Sifre et al. Rigid-motion scattering for image classification. Ph. D. thesis, 2014. 1.

Srivastava et al. Training very deep networks. In Advances in neural information processing systems, pp. 2377-2385, 2015. 1.

Szegedy et al. Going deeper with convolutions. In Proceedings of the IEEE conference on computer vision and pattern recognition, pp. 1-9, 2015. E.

Szegedy et al. Rethinking the inception architecture for computer vision. In Proceedings of the IEEE conference on computer vision and pattern recognition, pp. 2818-2826, 2016. 1, E.

Tan et al. Efficientnet: Rethinking model scaling for convolutional neural networks. arXiv preprint arXiv:1905.11946, 2019. 1, E.

Xu et al. Pc-darts: Partial channel connections for memory-efficient architecture search. In International Conference on Learning Representations, 2019. 2, 3.1.

* cited by examiner

METHOD AND SYSTEM FOR ACHIEVING OPTIMAL SEPARABLE CONVOLUTIONS

FIELD OF THE DISCLOSURE

The present disclosure relates to a method and system for image recognizing and processing, more particularly, to a method and system for improving the efficiency of analyzing image with Deep Convolutional Neural Networks (DCNN).

BACKGROUND

Tremendous progresses have been made in recent years towards more accurate image analysis tasks, such as image classification, with DCNN. However, the computational complexity and the amount of computation for state-of-the-art DCNN model have become increasingly high which leads to a higher working requirement for hardware. This can significantly defer their deployment to real-world applications, such as mobile platforms and robotics, where the resources are highly constrained. It is very much desired that a DCNN could achieve better performance with less computation and fewer model parameters.

The most time-consuming building block of a DCNN is the convolutional layer. There have been many previous works aiming at reducing the amount of computation in the convolutional layer. Historically, researchers apply Fast Fourier Transform (FFT) to implement convolution and they gain great speed up for large convolutional kernels.

For small convolutional kernels, a direct application is often still cheaper. Researchers also explore low rank approximation to implement convolutions. However, most of the existing methods start from a pre-trained model and mainly focus on network pruning and compression. In addition, researchers may adopt small convolution kernels and bottleneck structure to the design of DCNN. But these implementations are difficult to solve the problem of reducing the computational complexity of convolution computation.

Therefore, the existing technology needs to be improved and developed.

BRIEF SUMMARY OF THE DISCLOSURE

The purpose of the present disclosure is to provide a method and system for achieving optimal separable convolutions, and propose a design of separable convolutions to reduce the computational complexity of DCNN process.

One aspect of the present disclosure provides a method for achieving optimal separable convolutions. The method includes inputting an image to be analyzed and processed; calculating three sets of parameters of a separable convolution: an internal number of groups, a channel size and a kernel size of each separated convolution, and achieving optimal separable convolution process; and performing deep neural network image process.

Another aspect of the present disclosure provides a system for achieving optimal separable convolutions. The system includes an image input module configured to input an image to be analyzed and processed; an optimal separable convolution computational module configured to calculate three sets of parameters of a separable convolution: an internal number of groups, a channel size and a kernel size of each separated convolution, and to achieve optimal separable convolution process; and a deep neural network image processing module configured to perform deep neural network image process.

The present disclosure provides a method and a system for achieving optimal separable convolutions which efficiently reduces a computational complexity of deep neural network process. Comparing to the FFT and low rank approximation approaches, the method and system disclosed in the present disclosure is efficient for both small and large kernel sizes and shall not require a pre-trained model to operate on and can be deployed to applications where resources are highly constrained.

DETAILED DESCRIPTION OF EMBODIMENTS

The embodiments of the present disclosure will be described in detail below.

The present disclosure provides a method and system for achieving optimal separable convolutions. In order to clarify and clear the objectives, technical solutions and effects of the present disclosure, the present disclosure will be further described in detail with reference to the accompanying drawings and embodiments. The embodiments described hereinafter are only used to explain the present disclosure, and should not be construed as limiting the present disclosure. The content of the disclosure will be further explained through the description of the embodiments with reference to the accompanying drawings.

In an embodiment of the present disclosure, the method and system for achieving optimal separable convolutions are first applied to the technical field of image analysis. Therefore, when analyzing and processing an image, corresponding image data needs to be input from an existing device. The data may, but is not limited to, be input from a camera of a certain device, such as an image acquisition unit of a smart robot or a mobile phone. Especially an image acquisition device that works in real time may be implemented.

When a device of the embodiment of the present disclosure runs a system and software for processing and analyzing image, the obtained or input image is processed by a deep neural network image process, that is, processed by the method and system for image processing in the present disclosure. To improve a processing efficiency, a resolution of the image to be processed and a quantity of the data to be processed are pre-set.

In an embodiment of the method and system for achieving optimal separable convolutions of the present disclosure, three sets of parameters of a separable convolution: an internal number of groups, a channel size, and a kernel size of each separated convolution are automatically calculated to provide a solution of achieving optimal separation calculation, the resulting separable convolution is called the optimal separable convolution in the present disclosure.

Figure 1:
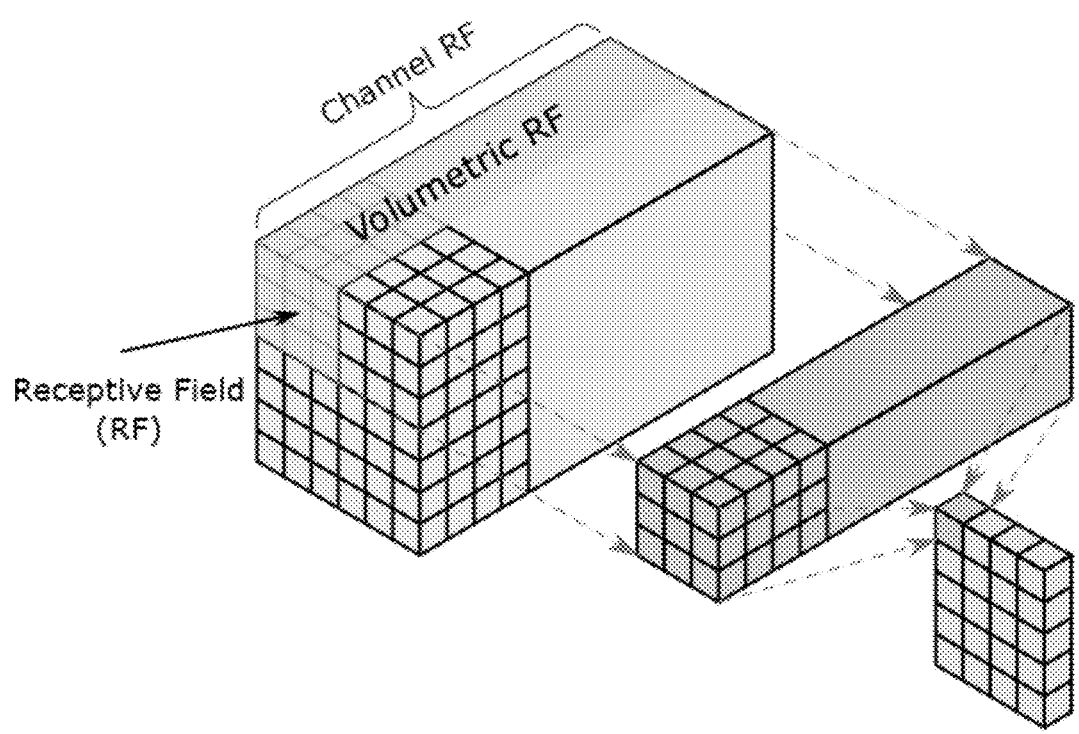
FIG. 1 illustrates a schematic diagram of a method and system for achieving optimal separable convolutions according to an embodiment of the present disclosure.
Figure 2:
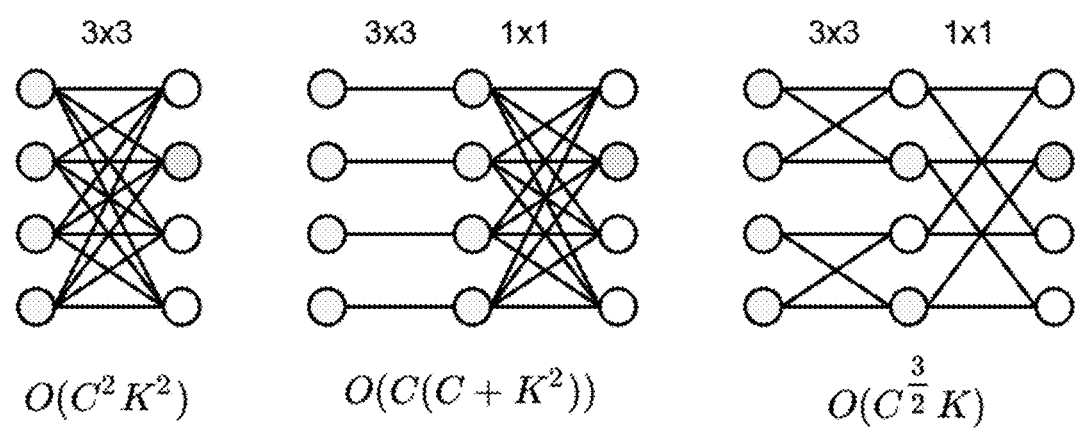
FIG. 2 illustrates a schematic diagram of an algorithm of the method and system for achieving optimal separable convolutions according to an embodiment of the present disclosure.

As shown in FIG. 1 and FIG. 2, similar to the receptive field (RF) of a convolution which is defined as a region in an input space that a feature of a particular Convolutional Neural Networks (CNN) is looking at (or affected by), the present disclosure defines a volumetric RF of a convolutional to be a volumetric in an input space that affects an output of a CNN.

In the present disclosure, a channel RF is defined to be channels that affect an output of a CNN, and a volumetric RF is defined to be a Cartesian product of a convolution. The receptive field RF and the channel RF of a convolution are calculated separately. The volumetric RF condition requires that a properly decomposed separable convolution maintains a same volumetric RF as the original convolution before decomposition. Hence, the optimal separable convolution proposed in the present disclosure will be equivalent to optimizing the internal number of groups and the kernel size to achieve a goal of calculating while satisfying the volumetric RF condition.

An objective function of the embodiment of the method and system for achieving optimal separable convolutions of the present disclosure is defined in form as:

$$f(g_1, g_2, C_2, K_*^{H|W}) = \frac{C_2 C_1 K_1^H K_1^W HW}{g_1} + \frac{C_3 C_2 K_2^H K_2^W HW}{g_2},$$

under constraints (conditions need to be satisfied) defined by:

$K_1^H + K_2^H - 1 = K^H$;

$K_1^W + K_2^W - 1 = K^W$;

$g_1 \cdot g_2 \leq C_2/\gamma \Leftrightarrow n_1 \cdot n_2 \geq \gamma C$;

$\min(C_l, C_{l+1} \geq g_l)$, where f is the Floating Point Operations (FLOPs), $C_l$ is the number of channels, $g_l$ is the number of groups, $n_l = C_l/g_l$ is the channels per group of the convolution, $K_l$ is the internal kernel size of the convolution, H and W are the height and width of the output feature respectively, and γ is the overlap coefficient.

The embodiment of the method and system in the present disclosure, a computational complexity of $O(C^{3/2} KHW)$ is used to calculate the proposed optimal separable convolution, which is discovered by comparison and verification to be more effective than the depth separable and the spatial separable convolution.

In the embodiment of the present disclosure, extensive experiments are carried out to demonstrate the effectiveness of the proposed optimal separable convolution. On the CIFAR10 dataset, the proposed optimal separable convolution in the embodiment of the present disclosure achieves a better Pareto-frontier than the conventional and depth separable convolution using a ResNet architecture.

To demonstrate the proposed optimal separable convolution may be applied to other DCNN architectures, the method and system for achieving optimal separable convolutions of the present disclosure adopt a DARTS architecture. By replacing the depth separable convolution with the proposed optimal separable convolution, the accuracy is increased from 97.24% to 97.67% with a same FLOP and fewer parameters. On the ImageNet dataset, the proposed optimal separable convolution also achieves an improved performance with a same FLOP and fewer parameters. For the DARTS architecture, the proposed method achieves 74.2% top1 accuracy with 4.5 million parameters, which is the top accuracy.

As shown in FIG. 2 is a schematic diagram illustrates the comparison of channel connections for, from left to right, conventional convolution, depth separable convolution, and the proposed optimal separable convolution. It can be seen that the optimal separable convolution of the present disclosure provides controllability of workload. The computational complexity is attached below the corresponding diagram.

Figure 3:
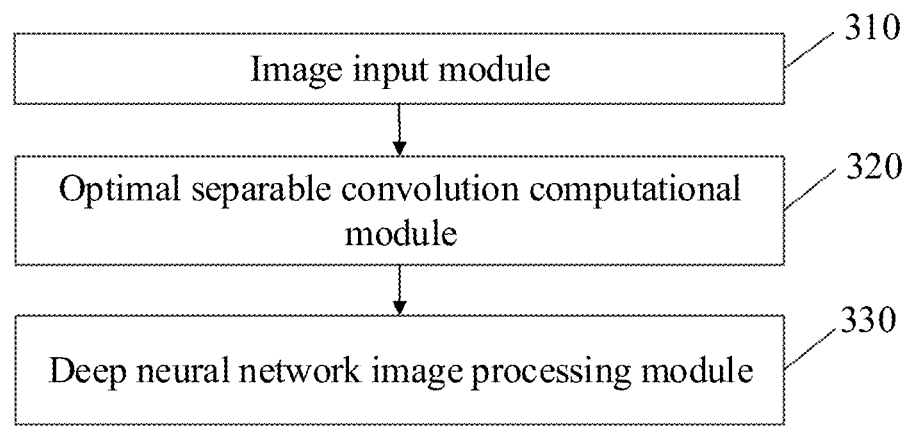
FIG. 3 illustrates a schematic diagram of the system for achieving the optimal separable convolutions of the present disclosure.

The system for achieving optimal separation convolutions disclosed in the present disclosure is a system for software implementation, which introduces an optimal separable computational process in the conventional convolution process of the deep neural network. As shown in FIG. 3, the system includes:

An image input module 310 which is configured to input an image to be analyzed and processed. The image input module 310 may be a digital camera or an electronic camera lens. An optimal separable convolution computational module 320 which is configured to automatically calculate the three sets of parameters of a separable convolution: the internal number of groups, the channel size, and the kernel size of each separated convolution, and to achieve an optimal separation convolution process. A deep neural network image processing module 330 which is configured to perform corresponding deep neural network image process, and to perform corresponding recognition and image processing.

In the embodiment of the method and system for achieving optimal separable convolutions disclosed in the present disclosure, a method for image processing which may reduce the complexity is provided through an optimal separable implementation. An efficient image recognition process shall be achieved without requiring redundant pre-training process.

It should be understood that those of ordinary skill in the art may change or modify the specific implementation and the scope of the application according to the embodiments of the present disclosure, all of which are within the scope of the present invention.

What is claimed is:

1. A method for achieving optimal separable convolutions, wherein being applied to image analyzing and processing, and comprising:
    step A, inputting an image to be analyzed and processed;
    step B, calculating three sets of parameters of a separable convolution: an internal number of groups, a channel size and a kernel size of each separated convolution, and achieving optimal separable convolution process;
    step C, performing deep neural network image process, wherein the step B comprises an objective function:

$$f(g_1, g_2, C_2, K_*^{H|W}) = \frac{C_2 C_1 K_1^H K_1^W HW}{g_1} + \frac{C_3 C_2 K_2^H K_2^W HW}{g_2},$$

under constraints defined by:

$K_1^H + K_2^H - 1 = K^H$;

$K_1^W + K_2^W - 1 = K^W$;

$g_1 \cdot g_2 \leq C_2/\gamma \Leftrightarrow n_1 \cdot n_2 \geq \gamma C$;

$\min(C_l, C_{l+1} \geq g_l)$, wherein f is a Floating Point Operations, $C_l$ is a number of channels, $g_l$ is a number of groups, $n_l = C_l/g_l$ is a channels per group of the convolution, $K_l$ is an internal kernel size of the convolution, H is a height of an output feature and W is width of the output feature, and γ is an overlap coefficient.

2. The method according to claim 1, wherein further comprising:
   calculating a volumetric receptive field to obtain the internal number of groups, the volumetric receptive field is a volume in an input space that affects an output of a convolutional neural network.

3. The method according to claim 2, wherein further comprising:
   calculating a channel receptive field of a convolution to obtain the channel size, the channel receptive field is a channel that affects the output of the convolutional neural network.

4. The method according to claim 3, wherein the volumetric receptive field is a Cartesian product of the convolution.

5. The method according to claim 4, wherein the volumetric receptive field requires a decomposed separable convolution maintains a same volumetric field as an original convolution before decomposition.

\* \* \* \* \*